United States Patent
Nakanishi (10) Patent No.: US 9,246,393 B2
(45) Date of Patent: Jan. 26, 2016

(54) DIRECT-CURRENT CONVERTER CAPABLE OF INCREASING OPERATING FREQUENCY

(71) Applicant: Sanken Electric Co., LTD., Niiza-shi, Saitama (JP)

(72) Inventor: Ryouta Nakanishi, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 104 days.

(21) Appl. No.: 13/870,086

(22) Filed: Apr. 25, 2013

(65) Prior Publication Data

US 2013/0294114 A1 Nov. 7, 2013

(30) Foreign Application Priority Data

May 7, 2012 (JP) ................................. 2012-106174

(51) Int. Cl.
H02M 3/335 (2006.01)
H02M 1/00 (2007.01)

(52) U.S. Cl.
CPC ...... *H02M 3/33507* (2013.01); *H02M 3/33569* (2013.01); *H02M 2001/0058* (2013.01); *Y02B 70/1491* (2013.01)

(58) Field of Classification Search
CPC .......... H02M 3/33507; H02M 3/3376; H02M 2001/0022; H02M 2001/0058; H02M 2001/0048; H02M 3/24
USPC .......... 363/21.01, 21.02, 21.03, 21.04, 21.12, 363/17, 56.02, 95, 132
See application file for complete search history.

(56) References Cited

U.S. PATENT DOCUMENTS

| | | | |
|---|---|---|---|
| 6,038,142 A * | 3/2000 | Fraidlin et al. | 363/17 |
| 6,064,580 A * | 5/2000 | Watanabe et al. | 363/17 |
| 6,778,410 B2 * | 8/2004 | Zeng et al. | 363/16 |
| 6,862,195 B2 * | 3/2005 | Jitaru | 363/17 |
| 8,189,351 B2 * | 5/2012 | Chung et al. | 363/17 |
| 2010/0165669 A1 * | 7/2010 | Li | 363/21.04 |
| 2010/0246215 A1 * | 9/2010 | Mase et al. | 363/21.04 |
| 2011/0051465 A1 * | 3/2011 | Usui | 363/21.02 |
| 2011/0051467 A1 * | 3/2011 | Nakanishi | 363/21.02 |
| 2012/0153729 A1 * | 6/2012 | Song et al. | 307/82 |
| 2012/0313433 A1 * | 12/2012 | Uno | 307/31 |
| 2013/0294114 A1 * | 11/2013 | Nakanishi | 363/21.01 |
| 2015/0009716 A1 * | 1/2015 | Suzuki | 363/21.02 |

FOREIGN PATENT DOCUMENTS

| | | |
|---|---|---|
| JP | 11-262263 | 9/1999 |
| JP | 2010-081736 A | 4/2010 |

* cited by examiner

*Primary Examiner* — Timothy J Dole
*Assistant Examiner* — Yusef Ahmed
(74) *Attorney, Agent, or Firm* — Banner & Witcoff, Ltd.

(57) ABSTRACT

A direct-current converter that includes: a first series circuit, which is connected in parallel with a smoothing capacitor and in which a first switching element and a second switching element are connected in series; a second series circuit, which is connected in parallel between main electrodes of the first switching element and in which a resonance capacitor, a resonance reactor and a primary winding of a transformer are connected in series; a half wave rectification smoothing circuit, which rectifies and smoothes a voltage of a secondary winding of the transformer; a control circuit configured to alternately turn on and off the first switching element and second switching element, based on an output voltage of the rectification smoothing circuit; and a third series circuit, which is connected in parallel with the second switching element and in which a boost reactor and a direct-current power supply are connected in series.

3 Claims, 8 Drawing Sheets

DIRECT-CURRENT VOLTAGE Vi
= LOW VOLTAGE

*FIG.7B*

DIRECT-CURRENT VOLTAGE Vi
= HIGH VOLTAGE

FIG.8A

DIRECT-CURRENT VOLTAGE Vi
= LOW VOLTAGE

FIG.8B

DIRECT-CURRENT VOLTAGE Vi
= HIGH VOLTAGE

DIRECT-CURRENT CONVERTER CAPABLE OF INCREASING OPERATING FREQUENCY

CROSS-REFERENCE TO RELATED APPLICATION

This application claims priority from Japanese Patent Application No. 2012-106174 filed on May 7, 2012, the entire subject matter of which is incorporated herein by reference.

TECHNICAL FIELD

This disclosure relates to a direct-current converter capable of increasing a frequency.

BACKGROUND

Figure 12:
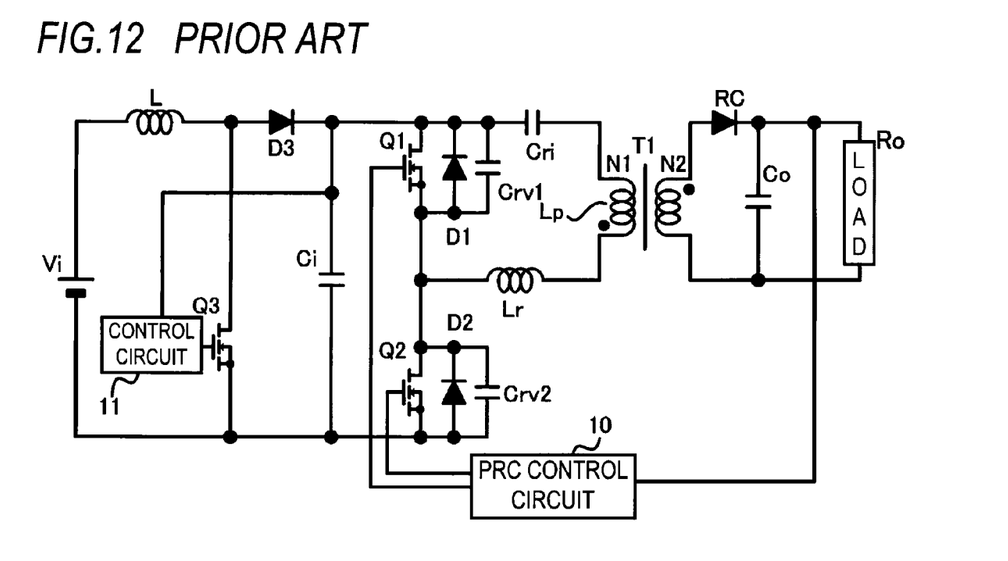
FIG. 12 is a circuit diagram of a background direct-current converter having a boost chopper and a step-down converter of a half wave current resonance-type.

FIG. 12 illustrates a circuit diagram of a background direct-current converter having a boost chopper and a step-down converter of a half wave current resonance-type. In the direct-current converter shown in FIG. 12, the boost chopper has a configuration where a series circuit of a reactor L and a switching element Q3 such as MOSFET is connected to both ends of a direct-current power supply Vi, and a series circuit of a diode D3 and a capacitor Ci is connected between a drain and a source of the switching element Q3, boosts a voltage of the direct-current power supply Vi and supplies the boosted voltage to the step-down converter.

The step-down converter has a configuration where a series circuit of switching element Q1 such as MOSFET and a switching element Q2 such as MOSFET is connected to both ends of a capacitor Ci, a series circuit of a current resonance capacitor Cri, a primary winding N1 of a transformer T and a reactor Lr connected between a drain and a source of the switching element Q1, and a series circuit of a diode RC and a capacitor Co is connected to both ends of a secondary winding N2 of the transformer T and outputs a direct-current voltage, which is insulated by stepping down a voltage of the capacitor Ci, to the capacitor Co.

In the background art, even when an input voltage is largely varied, it is possible to obtain a stable output voltage by the configuration of the boost chopper and the step-down converter. Meanwhile, JP-A-2010-81736 discloses an example of the configuration of the boost chopper and the step-down converter, as the prior art technology.

Also, JP-A-11-262263 discloses that the configuration of the boost chopper, and the step-down converter is made by a half bridge converter configuration, as one converter.

SUMMARY

However, since the boost chopper of JP-A-2010-81736 discontinuously operates at a light load, the voltage of the capacitor Ci is increased. Thus, a circuit for suppressing the voltage increase becomes complicated. For example, a method may be considered in which an on-time period is set to be very short or a stop time period is provided to the device to thus control the voltage by an intermittent operation.

Also, in the half bridge converter that also serves as the boost chopper disclosed in JP-A-11-262263, the half bridge converter performs a hard switching operation. Therefore, when a frequency is made higher, a switching loss and a noise are increased. Regarding this, when a frequency is set to be lower, a reactor becomes larger.

Also, when a load becomes a light load or no-load from a rated load, an on-duty becomes narrow. Accordingly, when there is a dynamic load variation, a feedback control response should be made earlier, so that it is difficult to adjust stability of the output voltage and responsiveness of the dynamic load variation.

This disclosure provides at least an direct-current converter of low-noise and high-efficiency having a simple configuration.

A direct-current converter of this disclosure includes: a first series circuit, which is connected in parallel with a smoothing capacitor and in which a first switching element and a second switching element are connected in series; a second series circuit, which is connected in parallel between main electrodes of the first switching element and in which a resonance capacitor, a resonance reactor and a primary winding of a transformer are connected in series; a half wave rectification smoothing circuit, which rectifies and smoothes a voltage of a secondary winding of the transformer; a control circuit configured to alternately turn on and off the first switching element and second switching element, based on an output voltage of the rectification smoothing circuit; and a third series circuit, which is connected in parallel with the second switching element and in which a boost reactor and a direct-current power supply are connected in series.

According to this disclosure, the series circuit having the boost reactor and the direct-current power supply connected in series with each other is provided in parallel with the switching element, so that a regenerative circuit is configured by a path in the order of the smoothing capacitor, the switching element, the boost reactor, the direct-current power supply, and the smoothing capacitor or a path in the order of the boost reactor, the direct-current power supply, the switching element, and the boost reactor. According to energy regeneration from the boost reactor and the smoothing capacitor by the regenerative circuit, it is possible to easily control the voltage at a light load while a voltage of the smoothing capacitor is not increased even in the light load.

Also, since the voltage of the smoothing capacitor is increased in accordance with an operation of the half wave current resonance circuit, it is possible to perform a resonance operation in all mode time periods. Therefore, since it is possible to achieve a zero voltage switching and a zero current switching of each switching element, it is possible to achieve the lower-noise the higher-efficiency and the higher-frequency.

Furthermore, since the half wave current resonance circuit controls the on-time period of the switching element Q1 constant from no-load to rated load, it is possible to suppress variation of the output voltage relative to dynamic variation of the load current and to obtain a stable output characteristic.

BRIEF DESCRIPTION OF THE DRAWINGS

The foregoing and additional features and characteristics of this disclosure will become more apparent from the following detailed descriptions considered with the reference to the accompanying drawings, wherein.

SUMMARY

Hereinafter, a few illustrative embodiments of the direct-current converter of this disclosure will be specifically described with reference to the drawings.

[Illustrative Embodiment]

Figure 1:
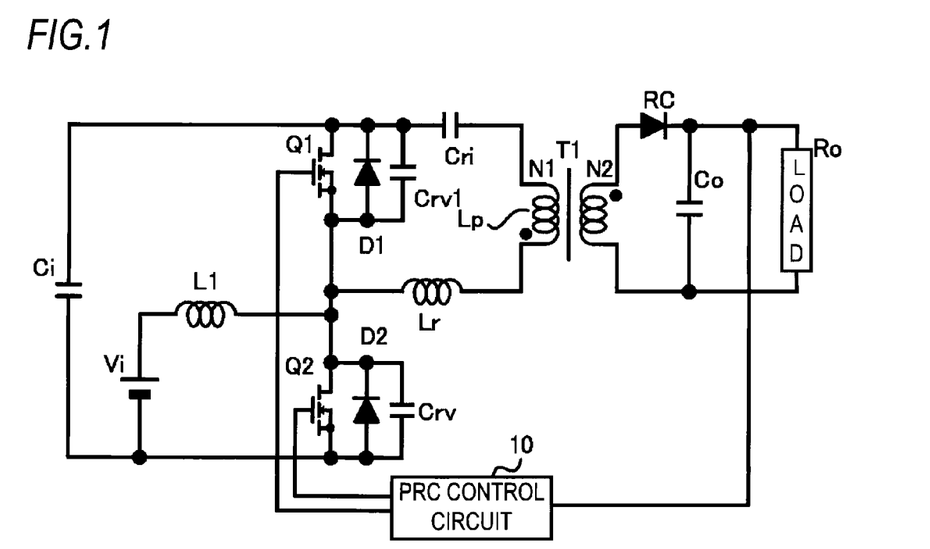
FIG. 1 is a circuit diagram of a direct-current converter of an illustrative embodiment.

FIG. 1 is a circuit diagram of a direct-current converter of an illustrative embodiment. The direct-current converter shown in FIG. 1 has a configuration where a series circuit of a direct-current power supply and a boost reactor is connected in parallel with a low side switching element Q2 of a half wave current resonance circuit. In FIG. 1, a series circuit of a switching element Q1 such as a MOSFET and the like and a switching element Q2 such as a MOSFET and the like is connected to both ends of a capacitor Ci corresponding to a voltage source of the half wave current resonance circuit.

Parallel circuit of diodes D1, D2 and capacitors Crv1, Crv2 are respectively connected between drains and sources of the respective switching elements Q1, Q2 configuring the half wave current resonance circuit. The diodes D1, D2 may be internal diodes of the respective switching elements Q1, Q2, and the capacitors Crv1, Crv2 may be internal capacities of the respective switching elements Q1, Q2.

A series circuit of a reactor Lr, a primary winding N1 exciting inductance Lp) of a transformer T1 and a current resonance capacitor Cri is connected in parallel between main electrodes of the switching element Q1. A series circuit of a diode RC and a capacitor Co is connected to both ends of a secondary winding N2 of the transformer T1. A load Ro is connected to both ends of the capacitor Co. Here, the reactor Lr includes a leakage inductance between the primary winding N1 and secondary winding N2 of the transformer T1.

A PRC control circuit 10 generates a pulse signal, based on an output voltage of the capacitor Co, and alternately turns on/off the switching element Q1 and the switching elements Q2 by the pulse signal. The PRC control circuit 10 performs frequency control of fixing an on-time period of the switching element Q1 transmitting energy to the secondary side and changing an off-time period thereof. Also, a series circuit of a boost reactor L1 and a direct-current power supply Vi is connected in parallel between the source and drain of the switching element Q2.

The direct-current converter shown in FIG. 1 charges the boost reactor L1 during the on-time period of the switching element Q2 and discharges the boost reactor L1 during the off-time period of the switching element Q2, thereby charging the capacitor Ci through the switching element Q1 (D1). That is, since the direct-current converter performs an operation equivalent to a typical boost chopper circuit, a voltage VCi of the capacitor Ci obtained by the operation is expressed by a following equation, where T is a switching period of the switching element Q1, Q2 and TQ1 and TQ2 are turned on-time periods of the switching elements Q1, Q2.

$$VCi = Vi \times T/(T-TQ2) = Vi \times T/TQ1 \quad (1)$$

In the circuit of FIG. 1, the series circuit of the reactor L1 and the direct-current power supply Vi is added in parallel with the switching element Q2 of the half wave current resonance circuit having a half bridge configuration, and the capacitor Ci is added in parallel with the series circuit of the switching elements Q1, Q2. Accordingly, it may be thought that the energy transmitted to the secondary side is supplied from a half bridge-type converter having the capacitor Ci, as a power supply. In the half bridge-type converter, the energy is accumulated to the capacitor Cri during the on-time period of the switching element Q2, and the energy of the capacitor Cri is transmitted to the secondary side during the on-time period of the switching element Q1.

The voltage VCri that is accumulated into the capacitor Cri is as follows.

$$VCri = VCi \times TQ2/T \quad (2)$$

When the number of windings of the primary vin winding N1 of the transformer T1 and the number of windings of the secondary winding N2 are denoted with n1 and n2, respectively, an output voltage Vo is as follows, $$Vo = VCri \times n2/n1 \quad (3)$$

When the equations (1) and (2) are substituted for the equation (3), the output voltage Vo is as follows.

$$Vo = Vi \times TQ2/TQ1 \times n2/n1 \quad (4)$$

Therefore, the output voltage Vo can be controlled by adjusting the on-time periods TQ1, TQ2 of the switching elements Q1, Q2.

Figure 2:
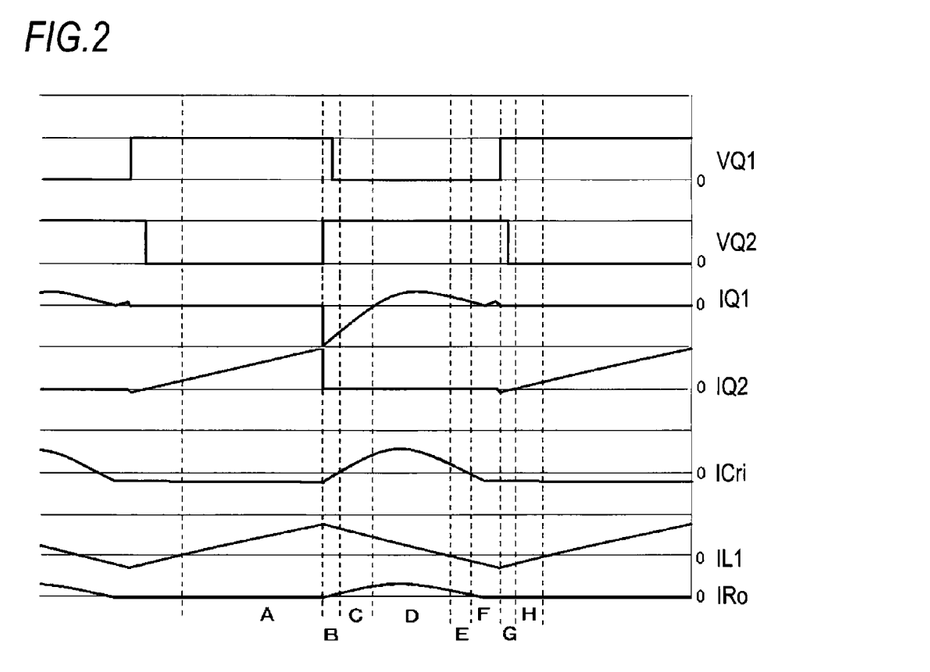
FIG. 2 illustrates voltage and current waveforms upon operations of respective switching elements of the direct-current converter of the illustrative embodiment.

In the below, operations of the direct-current converter configured as described above are specifically described with reference to FIG. 2 illustrating voltage/current waveforms upon operations of the respective switching elements and FIGS. 3A to 3H illustrating current paths upon operations of the respective switching elements in respective modes of FIG. 2.

Figure 3A:
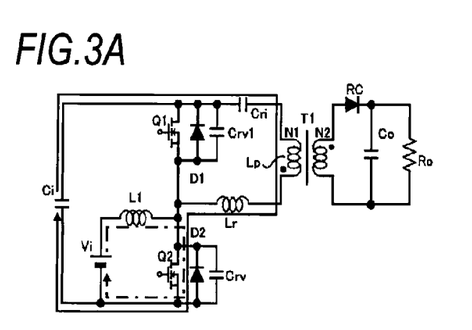
FIGS. 3A to 3H illustrate current paths upon operations of respective switching elements in respective modes of FIG. 2.

First, in a mode A shown in a time period A of FIG. 2 and in FIG. 3A, the switching element Q1 is turned off and the switching element Q2 is turned on. During this time period, the capacitor Ci is discharged, the capacitor Cri is charged and the current flows through a first path (hereinafter, a first path in the respective figures is described by a solid line) in order of Ci, Cri, Lp, Lr, Q2, and Ci. Also, as the switching element Q2 becomes on, the current flows through a second path (hereinafter, a second path in the respective figures is described by a solid line) in order of Vi, L1, Q2, and Vi, and then the reactor L1 is charged.

Figure 3B:
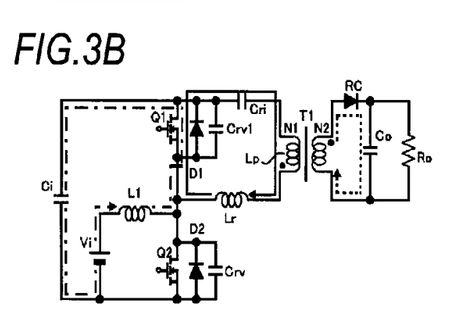

Then, in a mode B shown in a time period B of FIG. 2 and in FIG. 3B, the switching elements Q1, Q2 are turned off. At this time the charging and discharging currents commutate to the body diode D1 of the switching element Q1, so that a zero current switching ZCS is performed. That is, the current flows through a first path in order of Lp, Lr, Q1 (D1), Cri, and Lp. By the current resonance of the reactor Lr and the capacitor Cri during this time period, the current starts to flow to the diode RC and capacitor Co configuring a rectification smoothing circuit of the secondary side through the windings N1, N2 of the transformer T1. Also, the current flows through a second path in order of L1, Q1 (D1), Ci, Vi, and L1, and then the capacitor Ci is charged. During this time period B, the switching element Q2 is turned on to thus achieve a zero voltage switching ZVS.

Figure 3C:
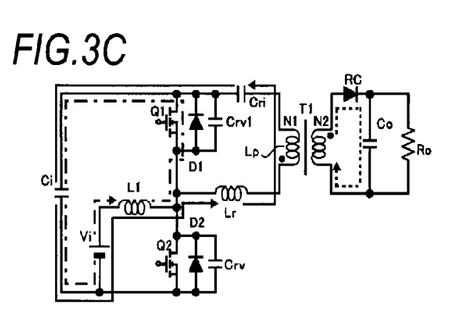

Then, in a mode C shown in a time period C of FIG. 2 and in FIG. 3C, the switching element Q1 is turned on. The capacitor Cri is changed to the discharging state from the mode B. That is, the current flows through a first path in order of Cri, Ci, Vi, L1, Lr, Lp, and Cri. Also, the diode RC connected to the secondary winding N2 of the transformer T1 is made to be conductive, and the energy is transmitted from the primary side to the secondary side of the transformer T1 by the resonance of the reactor Lr and the current resonance capacitor Cri. Also, the current flows through a second path in order of L1, Q1 (D1), Ci, Vi, and L1, and the capacitor Ci is continuously charged.

Figure 3D:
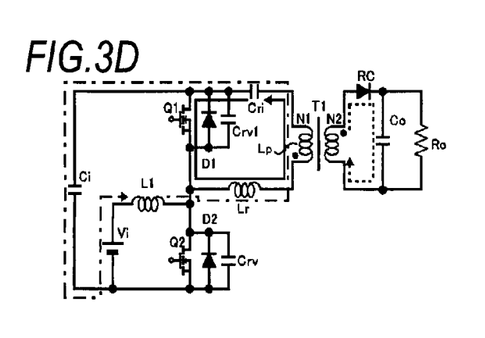

Then, in a mode D shown in a time period D of FIG. 2 and in FIG. 3D, the switching element Q1 is turned on, so that a first path is changed and then the discharge of the capacitor Cri starts. The capacitor Cri is discharged via a first path in order of Cri, Q1, Lr, Lp, and Cri. Also, the current continues to flow to the secondary side by the current resonance of the reactor Lr and the capacitor Cri and then becomes maximal in the time period of the mode D. Also, the reactor Lr is continuously discharged, the current flows through a second path in order of L1, Lr, Lp, Cri, Ci, Vi, and L1, and the capacitor Ci is charged.

Figure 3E:
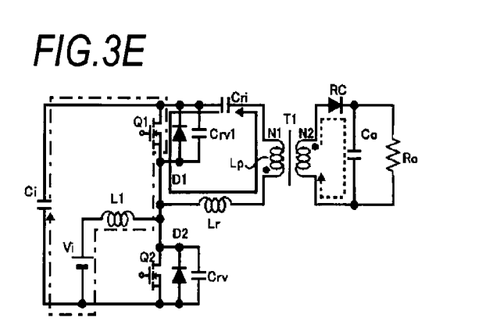

Then, in a mode E shown in a time period E of FIG. 2 and in FIG. 3E, the switching element Q1 is turned on, and the switching element Q2 is turned off. The discharge of the capacitor Cri continues. The first path in order of Cri, Q1, Lr, Lp, and Cri is not changed and also the current continues to flow to the secondary side. Meanwhile, the capacitor Ci is changed to the discharging state, and a regenerative time period during which the current flows into the direct-current power supply Vi comes. That is, the current flows through a second path in order of Ci, Q1, L1, Vi, and Ci.

Figure 3F:
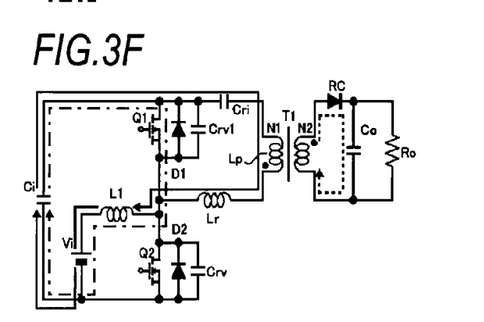

Then, in a mode F shown in a time period F of FIG. 2 and in FIG. 3F, the capacitor Cri is charged and the reactors Lr, Lp are discharged. That is, the current flows in a first path in order of Ci, Cri, Lp, Lr, L1, Vi, and Ci. Also, the current continues to flow to the secondary side by the current resonance of the reactor Lr and the capacitor Cri. Similarly to the mode E, the current flows in a second path in order of Ci, Q1, L1, Vi, and Ci, and the regenerative time period during which the current flows into the direct-current power supply Vi continues.

In the meantime, the current resonance energy of the reactor Lr and the capacitor Cri is discharged during the time period of the mode F, and then the conductive state of the diode RC connected to the secondary-side winding N2 of the transformer T1 becomes off.

Figure 3G:
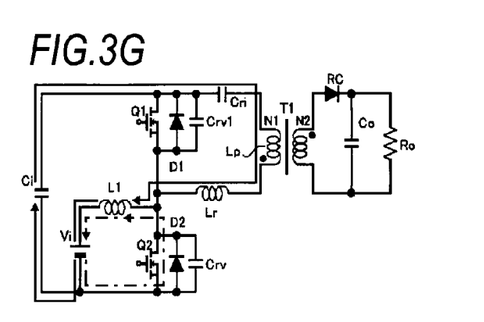

Then, in a mode G shown in a time period G of FIG. 2 and in FIG. 3G, the switching element Q1 is to be turned off. That is, both the switching elements Q1, Q2 is to be turned off. When the switching element Q1 is turned off, a second path in order in the mode G is changed to a path in the order of L1, Vi, Q2 (D2), and L1. However, the reactor L1 is discharged, so that the regenerative time period during which the current flows into the direct-current power supply Vi continues. During this time period, when the switching element Q2 is tuned on, the zero voltage switching ZVS of the switching element Q2 can be achieved. Also, when the switching element Q1 is turned off, the current IQ1 flowing through the switching element Q1 is switched to the above-descried second path. Accordingly, the switching element Q1 achieves the zero current switching ZCS.

Meanwhile, the charging of the capacitor Cri continues, so that the reactors Lr, and Lp are changed to the charging state and the current flows through a first path in order of Ci, Cri, Lp, Lr, L1, Vi, and Ci.

Figure 3H:
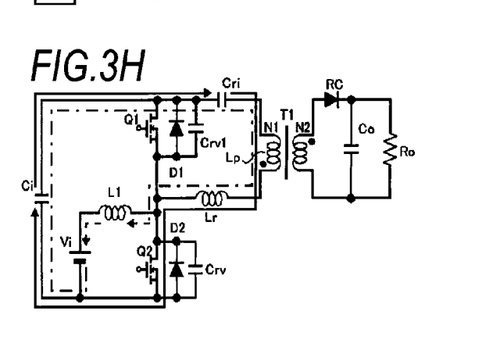

Then, in a mode H shown in a time period H of FIG. 2 and in FIG. 3H, the switching element Q1 is to be tuned off and the switching element Q2 is to be turned on. Here, the switching element Q2 is turned on, so that the current flows in a first path in order of Ci, Cri, Lp, Lr, Q2, and Ci and also the charging of the capacitor Cri continues. Meanwhile, although the regenerative time period by the discharging of the reactor L continues, the path is changed to a first path in order of L1, Vi, Ci, Cri, Lp, Lr, and L1.

Here, when the discharging of the reactor L1 during the time period H is over, the reactor L1 is changed to the charging state. That is, the mode is shifted to the mode A shown in the time period A of FIG. 2 and in FIG. 3A.

As described above, since the direct-current converter of the illustrative embodiment boosts the voltage by the reactor L1 in accordance with the operation of the half wave current resonance circuit, it can perform the resonance operation in all the mode time periods. Accordingly, since it is possible to achieve the zero voltage switching ZVS and the zero current switching ZCS of the respective switching elements Q1, Q2, it is possible to achieve the lower-noise, the higher-efficiency and the higher-frequency.

Also, since the control circuit of the boost chopper and the half wave current resonance circuit is to be one, the direct-current converter has the simple configuration and is inexpensive. Also, since the boost circuit has the regenerative time period, the voltage of the capacitor C1 is not increased even in a light load, and thus the control on the voltage can be easily performed at the light load.

(Specific Circuit Configuration of Illustrative Embodiment)

Figure 4:
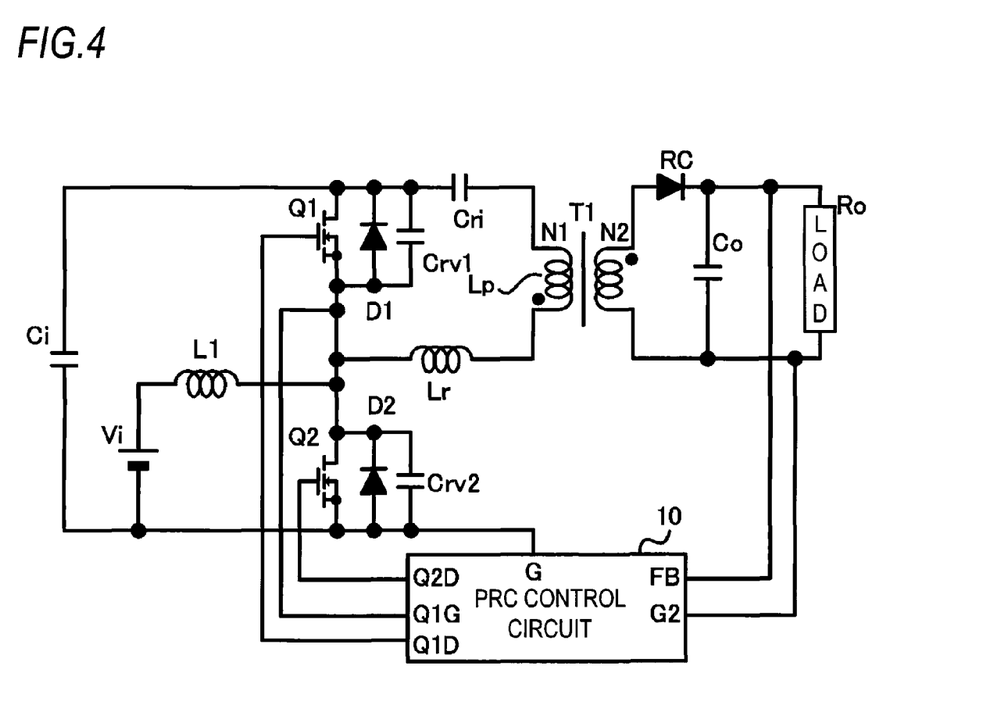
FIG. 4 is a circuit diagram illustrating a specific example of the direct-current converter of the illustrative embodiment.

Subsequently, a specific example of the direct-current converter of the illustrative embodiment is described with reference to FIGS. 4 and 5. In FIG. 1, the PRC control circuit 10 is shown by a block diagram. In FIG. 4, a more specific connection diagram is shown. Also, FIG. 5 illustrates a detailed configuration view of the PRC control circuit 10.

The direct-current converter shown in FIG. 4 is described to have a connection diagram where the connection of the PRC control circuit 10 to the direct-current converter shown in FIG. 1 is more specifically implemented.

Figure 5:
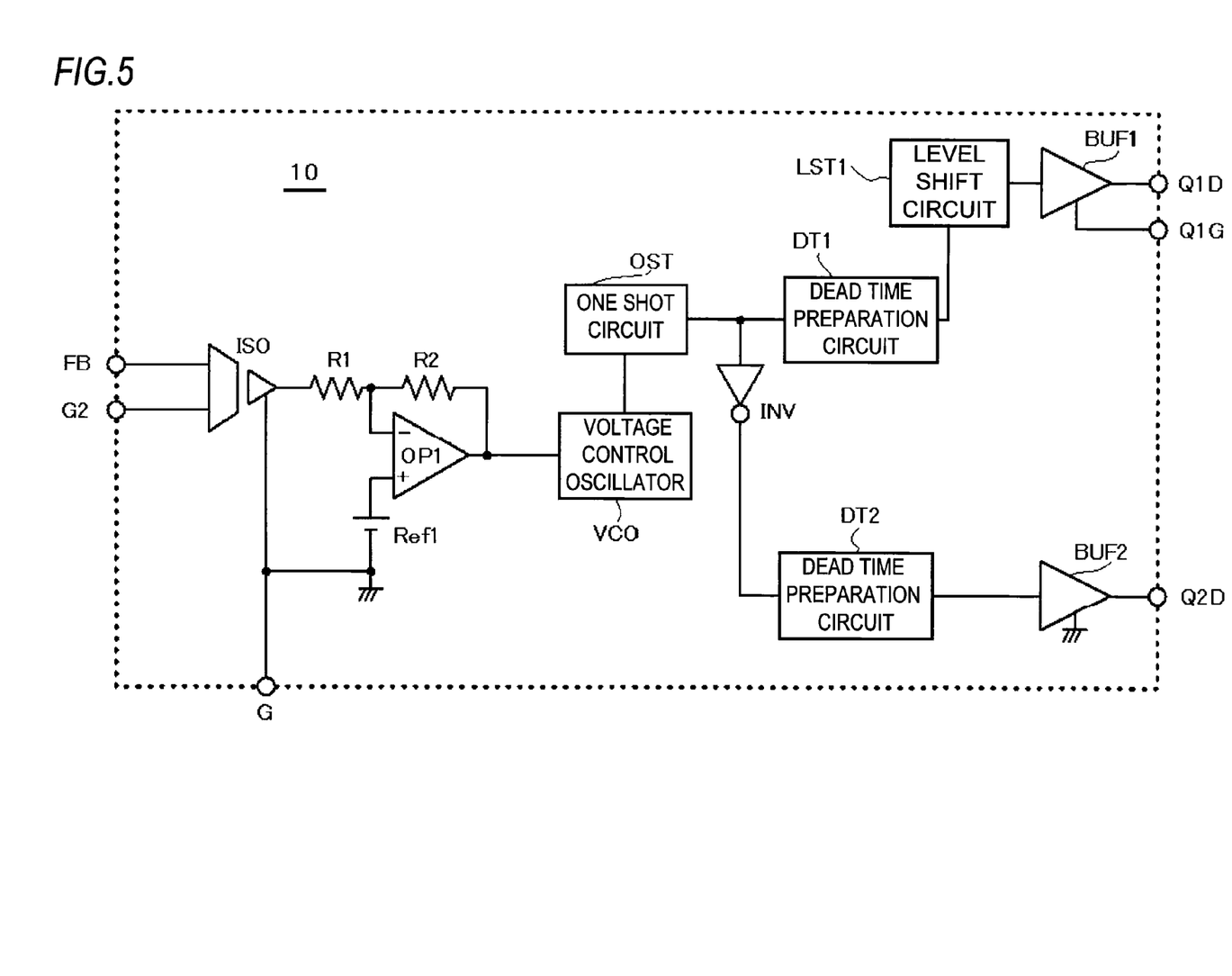
FIG. 5 is a circuit diagram illustrating details of a control circuit shown in FIG. 4.
Figure 6:
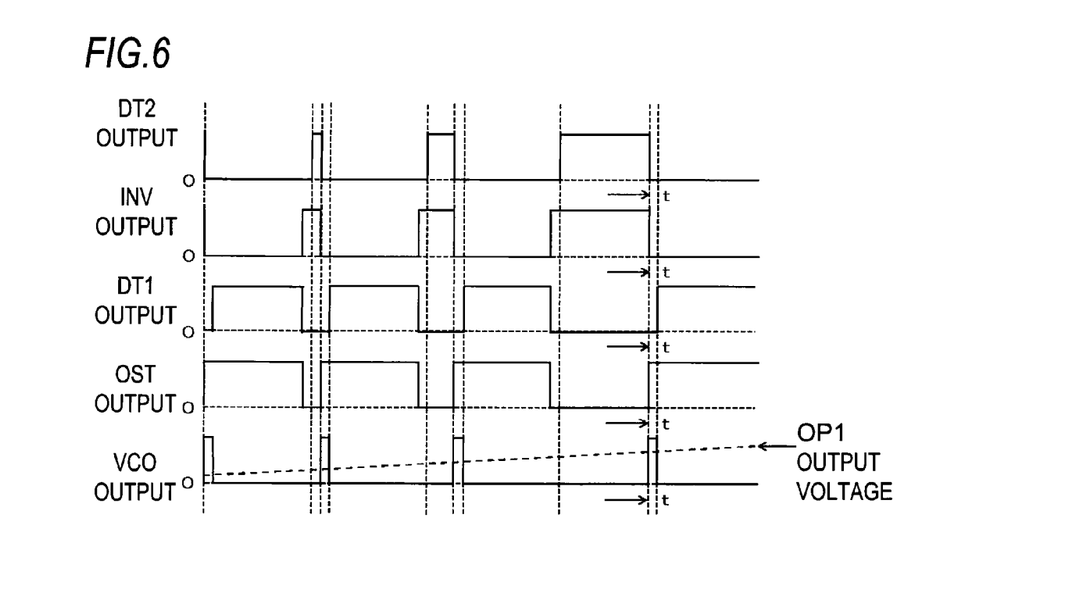
FIG. 6 illustrates operation waveforms of respective units of the control circuit shown in FIG. 5.

FIG. 5 is a circuit diagram illustrating details of the PRC control circuit 10 of the direct-current converter of the illustrative embodiment shown in FIG. 4. FIG. 6 illustrates operation waveforms of respective units of the control circuit shown in FIG. 5.

In the PRC control circuit 10, an operational amplifier OP1 amplifies a difference voltage between an output voltage of the capacitor Co input through an ISO and a reference voltage Ref1. A voltage control oscillator VCO generates a pulse signal having a frequency corresponding to a value of the difference voltage from the operational amplifier OP1, i.e., outputs a VCO output shown in FIG. 6.

In synchronization with an increase of the pulse signal from the voltage control oscillator VCO, a one-shot circuit OST generates a pulse signal (ONE-SHOT output) having a predetermined on-width. An inverter INV generates an inverted pulse signal (INV output) that is obtained by inverting the pulse signal from the one-shot circuit OST.

A dead time preparation circuit DT1 generates a delayed pulse signal (DT1 output) that is obtained by delaying the pulse signal from the one-shot circuit OST by predetermined dead time. A level shift circuit LST1 level-shifts the delayed pulse signal from the dead time preparation circuit DT1. A buffer BUF1 applies the pulse signal from the level shift circuit LSTi to a gate of the switching element Q1.

A dead time preparation circuit DT2 generates a delayed pulse signal (DT2 output) that is obtained by delaying an inverted pulse signal from an inverter INV by predetermined dead time. A buffer BUF2 applies the pulse signal from the dead time preparation circuit DT2 to a gate of the switching element Q2.

The PRC control circuit 10 generates a pulse signal, based on the output voltage of the capacitor Co, and alternately turns on/off the switching element Q1 and the switching element Q2 by the generated pulse signal.

Figure 7A:
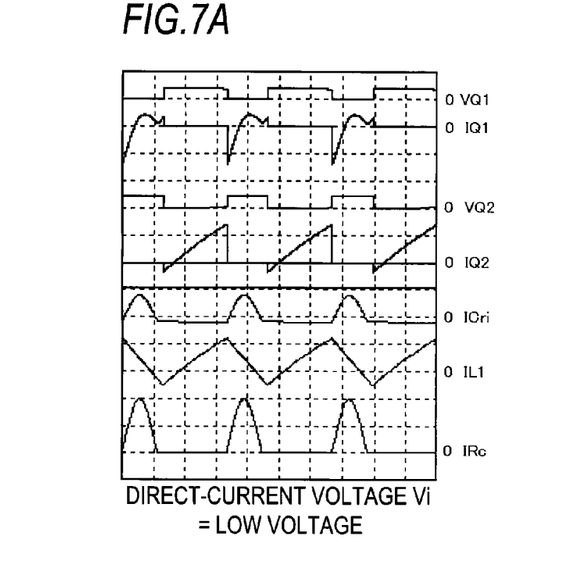
FIGS. 7A and 7B illustrate operation waveforms of respective units of the direct-current converter of the illustrative embodiment.
Figure 7B:
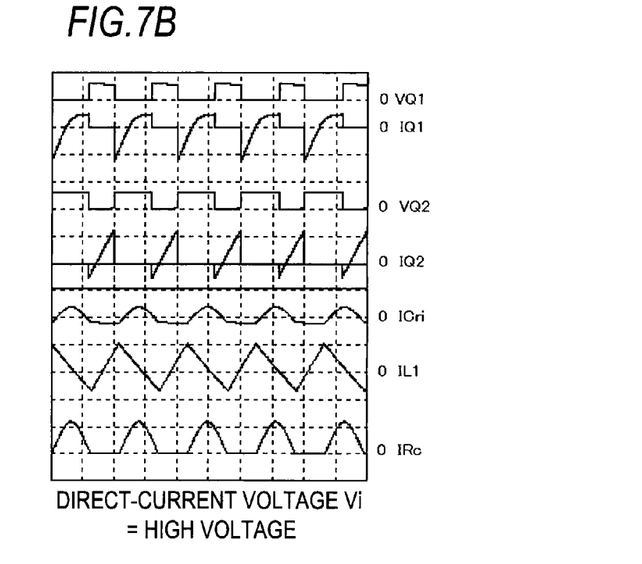

FIGS. 7A and 7B illustrates operation waveforms of the respective units of the direct-current converter of the illustrative embodiment. FIG. 7A illustrates operation waveforms of the respective units when a voltage of the direct-current power supply Vi is a low voltage, and FIG. 7B illustrates operation waveforms of the respective units when a voltage of the direct-current power supply Vi is a high voltage. It can be seen that a surge voltage does not occur in any of the off waveforms of voltages VQ1, VQ2 between the drains and sources of the respective switching elements Q1, Q2 shown in FIGS. 7A and 7B, and then zero voltage switching ZVS is achieved. Also, it can be seen that the drain currents IQ1, IQ2 start at a minus current when any of the voltages VQ1, VQ2 between the drains and sources of the respective switching elements Q1, Q2 turns on and the zero current switching ZCS is achieved.

Figure 8A:
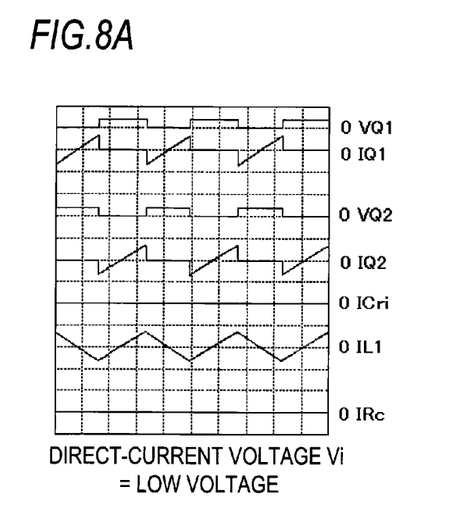
FIGS. 8A and 8B illustrate operation waveforms of respective units at no-load of the direct-current converter of the illustrative embodiment.
Figure 8B:
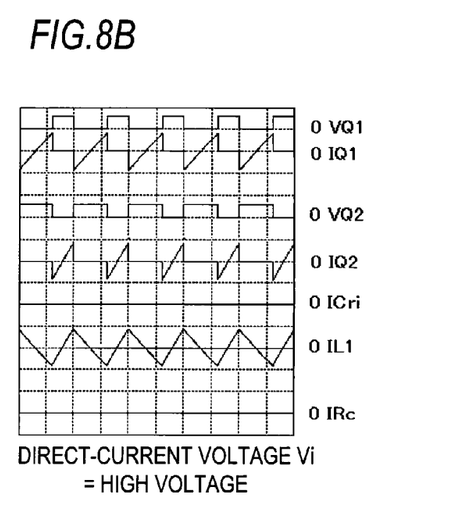

FIGS. 8A and 8B illustrates operation waveforms of respective units at no-load of the direct-current converter of the illustrative embodiment. FIG. 8A illustrates operation waveforms of the respective units when a voltage of the direct-current power supply Vi is a low voltage, and FIG. 5B illustrates operation waveforms of the respective units when a voltage of the direct-current power supply Vi is a high voltage. It can be seen that a surge voltage does not occur in any of the off waveforms of the voltages VQ1, VQ2 between the drains and sources of the respective switching elements Q1, Q2 shown in FIGS. 8A and 8B, and the zero voltage switching ZVS is achieved. Also, it can be seen that the drain currents IQ1, IQ2 start at a minus current when any of the voltages VQ1, VQ2 between the drains and sources of the respective switching elements Q1, Q2 turns on, and the zero current switching ZCS is achieved.

Also, comparing FIG. 7A at a rated load and FIG. 8A at no-load or FIG. 7B and FIG. 8B, it can be seen that the on-width of the switching element Q1 is not largely varied according to a magnitude of the load.

(First Modified Embodiment of Illustrative Embodiment)

Figure 9:
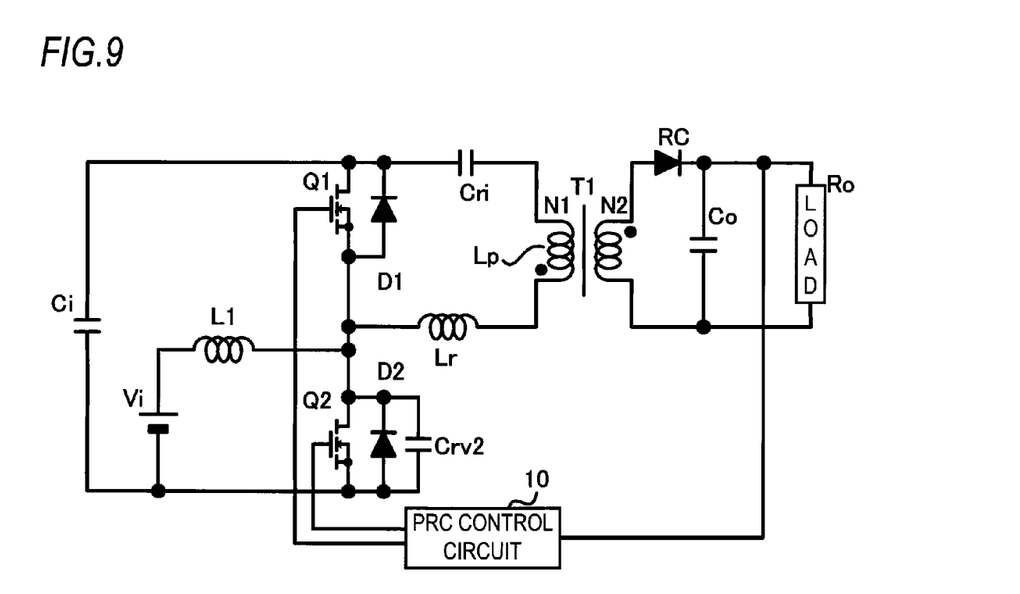
FIG. 9 is a circuit diagram illustrating a first modified embodiment of the direct-current converter of the illustrative embodiment.

FIG. 9 is a circuit diagram illustrating a first modified embodiment of the direct-current converter of the illustrative embodiment.

FIG. 9 is a configuration view illustrating that the capacitors Crv1, Crv2 of the illustrative embodiment shown in FIG. 1 connected in parallel between the drains and sources of the respective switching elements Q1, Q2 in the circuit diagram of the direct-current converter are integrated between the drain and source of the switching element Q2. Even when the capacitors are integrated to the switching element Q2-side, it is possible to achieve the soft switching of the respective switching elements Q1, Q2.

(Second Modified Embodiment of Illustrative Embodiment)

Figure 10:
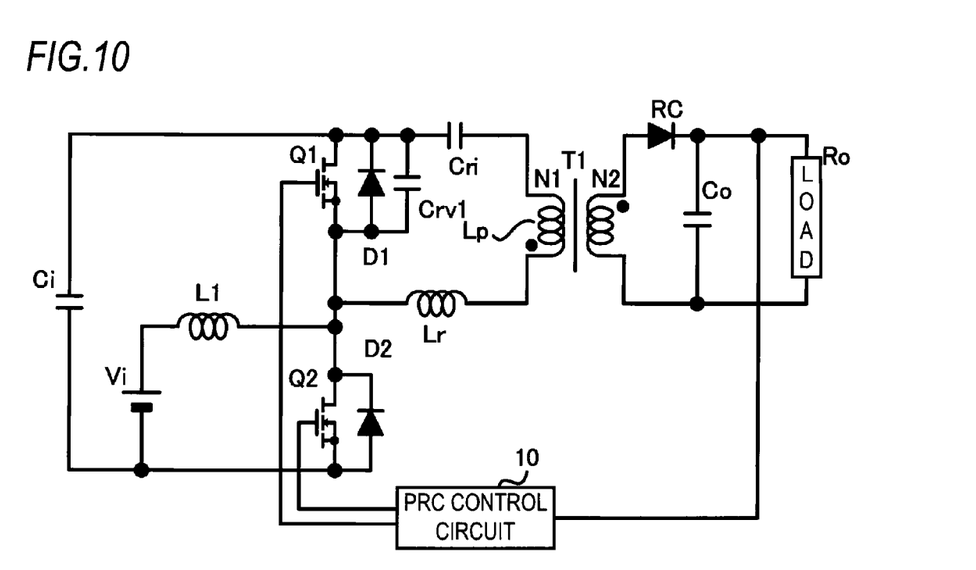
FIG. 10 is a circuit diagram illustrating a second modified embodiment of the direct-current converter of the illustrative embodiment.

FIG. 10 is a circuit diagram illustrating a second modified embodiment of the direct-current converter of the illustrative embodiment.

FIG. 10 is a configuration view illustrating that the capacitors Crv1, Crv2 of the illustrative embodiment shown in FIG. 1 connected in parallel between the drains and sources of the respective switching elements Q1, Q2 in the circuit diagram of the direct-current converter are integrated between the drain and source of the switching element Q1. Even when the capacitors are integrated to the switching element Q1-side, it is possible to achieve the soft switching of the respective switching elements Q1, Q2.

(Third Modified Embodiment of Illustrative Embodiment)

Figure 11:
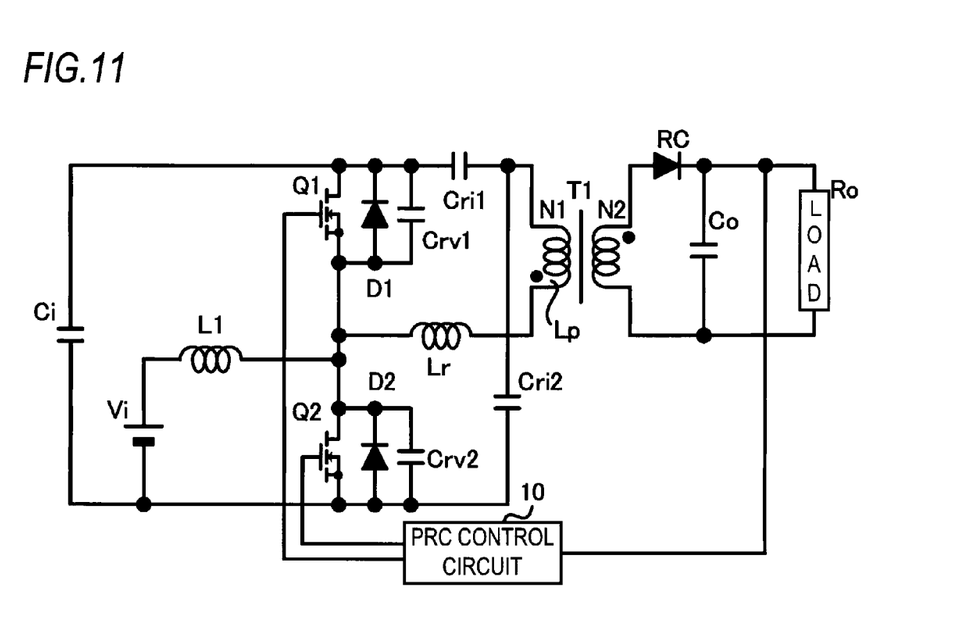
FIG. 11 is a circuit diagram illustrating a third modified embodiment of the direct-current converter of the illustrative embodiment.

FIG. 11 is a circuit diagram illustrating a third modified embodiment of the direct-current converter of the illustrative embodiment.

FIG. 11 is a configuration view illustrating that the capacitor Cri in the circuit diagram of the direct-current converter of the illustrative embodiment shown in FIG. 1 is divided into capacitors Cri1, Cri2.

As shown in FIG. 11, the capacitors Cri1, Cri2 are connected in series with each other and are connected in parallel with the capacitor Ci, and a connection point of the capacitors Cri1, Cri2 is connected to one terminal of the primary winding N1 of the transformer T1. At this time, capacitances of the capacitors Cri1, Cri2 are set so that a combined capacitance of the capacitors Cri1, Cri2 in the parallel connection is the same as a capacitance of the capacitor Cri before the change.

Although the illustrative embodiments of this disclosure have been described, this disclosure is not limited to the specific embodiments and can be variously modified and changed within a range of the gist of this disclosure defined in the claims. For example, although the switching elements Q1, Q2 have been described using the MOSFET, they can be also changed to IGBT (insulated gate bipolar transistor), HEMT (high-electron-mobility transistor) and the like. Also, the first or second modified embodiment of the illustrative embodiment may be combined with the third modified embodiment.

This disclosure can be applied to a direct-current converter of a wide range input.

What is claimed is:
1. A direct-current converter comprising:
a first series circuit, which is connected in parallel with a smoothing capacitor and in which a first switching element and a second switching element are connected in series;
a second series circuit, which is connected in parallel between main electrodes of the first switching element and in which a resonance capacitor, a resonance reactor and a primary winding of a transformer are connected in series;
a half wave rectification smoothing circuit, which rectifies and smoothes a voltage of a secondary winding of the transformer;
a control circuit configured to alternately turn on and off the first switching element and second switching element, based on an output voltage of the rectification smoothing circuit; and
a third series circuit, which is connected in parallel with the second switching element and in which a boost reactor and a direct-current power supply are connected in series, wherein the third series circuit is connected in series with a parallel circuit comprising the first switching element and the second series circuit, the first switching element connected in parallel with the second series circuit,
wherein, when the second switching element is turned on, the boost reactor of the third series circuit is charged by the direct-current power supply and the smoothing capacitor connected in parallel to the first series circuit is discharged through the second series circuit, and wherein, when the second switching element is turned off, the smoothing capacitor is charged by discharging charged energy of the boost reactor of the third series circuit.

2. The direct-current converter according to claim 1, wherein the control circuit performs frequency control fixing an on-time period of the first switching element, and wherein the control circuit controls the on-time period of the second switching element in accordance with the output voltage.

3. The direct-current converter according to claim 1, wherein the resonance reactor includes a leakage inductance between the primary winding and secondary winding of the transformer.

* * * * *